United States Patent
Yu et al.

(10) Patent No.: US 12,045,966 B2
(45) Date of Patent: Jul. 23, 2024

(54) TUNNEL-INSPECTION IMAGE ACQUISITION DEVICE, TUNNEL-INSPECTION SYSTEM, AND TUNNEL-INSPECTION METHOD

(71) Applicant: SHANGHAI ORIENTAL MARITIME ENGINEERING TECHNOLOGY CO., LTD., Shanghai (CN)

(72) Inventors: Tianle Yu, Shanghai (CN); Jun Kuang, Shanghai (CN); Jidong Yao, Shanghai (CN)

(73) Assignee: Shanghai Oriental Maritime Engineering Technology Co., Ltd., Shanghai (CN)

(*) Notice: Subject to any disclaimer, the term of this patent is extended or adjusted under 35 U.S.C. 154(b) by 0 days.

(21) Appl. No.: 17/767,437

(22) PCT Filed: Sep. 23, 2020

(86) PCT No.: PCT/CN2020/117088
§ 371 (c)(1),
(2) Date: Apr. 8, 2022

(87) PCT Pub. No.: WO2021/068746
PCT Pub. Date: Apr. 15, 2021

(65) Prior Publication Data
US 2024/0070831 A1    Feb. 29, 2024

(30) Foreign Application Priority Data

| Oct. 8, 2019 | (CN) | ......................... | 201910949507.4 |
| Oct. 8, 2019 | (CN) | ......................... | 201910949526.7 |
| Oct. 8, 2019 | (CN) | ......................... | 201921669806.4 |

(51) Int. Cl.
*G06T 7/00* (2017.01)
*G06T 5/20* (2006.01)
(Continued)

(52) U.S. Cl.
CPC .............. *G06T 7/0002* (2013.01); *G06T 5/20* (2013.01); *G06T 5/70* (2024.01); *G06T 7/11* (2017.01);
(Continued)

(58) Field of Classification Search
CPC ......... G06T 7/0002; G06T 5/002; G06T 5/20; G06T 7/11; G06T 2207/20132;
(Continued)

(56) References Cited

U.S. PATENT DOCUMENTS 9,810,642 B2 * 11/2017 Akashi ................ G01N 21/954
11,089,237 B2 * 8/2021 Takasu ................ H04N 23/698
(Continued)

FOREIGN PATENT DOCUMENTS

| CN | 104019742 A | * | 9/2014 |
| CN | 104567708 A | | 4/2015 |

(Continued)

OTHER PUBLICATIONS

English Translation of CN-105510351-A (Year: 2016).*
(Continued)

*Primary Examiner* — John R Schnurr
(74) *Attorney, Agent, or Firm* — Zhu Lehnhoff LLP

(57) ABSTRACT

Disclosed are a tunnel-inspection image acquisition device, a tunnel-inspection system and a tunnel-inspection method. With a plurality of CCD cameras, a plurality of auxiliary light sources and a fixing bracket, wherein the CCD cameras and the auxiliary light sources are fixed on the fixing bracket, and the plurality of CCD cameras are fixed on the same ring, a center of the ring is located at a center of a circle (Continued)

of the tunnel in working condition, distances between the plurality of CCD cameras and a tunnel lining are the same and overall shooting angles of the plurality of CCD cameras cover a range of the tunnel lining; meanwhile, with the cooperation of a computer, a monitor, a synchronous encoder and a data collector on a defect detecting mobile platform, functions such as the synchronous shooting, the disease identification, the real-time splicing and display of the tunnel can be achieved. In this design, the invention has the technical characteristics of simple structure, large detection range, high timeliness, fast detection speed, high recognition accuracy, accurate inspection positioning, clear captured images and the like.

8 Claims, 7 Drawing Sheets

(51) Int. Cl.
| | | |
|---|---|---|
| *G06T 5/70* | (2024.01) | |
| *G06T 7/11* | (2017.01) | |
| *G06V 20/10* | (2022.01) | |
| *G06V 20/70* | (2022.01) | |
| *H04N 5/06* | (2006.01) | |
| *H04N 7/18* | (2006.01) | |
| *H04N 23/56* | (2023.01) | |
| *H04N 23/74* | (2023.01) | |
| *H04N 23/90* | (2023.01) | |

(52) U.S. Cl.
CPC ............ *G06V 20/176* (2022.01); *G06V 20/70* (2022.01); *H04N 5/06* (2013.01); *H04N 7/181* (2013.01); *H04N 23/56* (2023.01); *H04N 23/74* (2023.01); *H04N 23/90* (2023.01); *G06T 2207/20132* (2013.01); *G06T 2207/30184* (2013.01)

(58) Field of Classification Search
CPC ........ G06T 2207/30184; G06V 20/176; G06V 20/70; H04N 5/06; H04N 7/181; H04N 23/56; H04N 23/74; H04N 23/90
See application file for complete search history.

(56) References Cited

U.S. PATENT DOCUMENTS

| | | | | |
|---|---|---|---|---|
| 2016/0227126 | A1* | 8/2016 | Akashi | G01M 3/38 |
| 2019/0332881 | A1* | 10/2019 | Hoshino | G06V 10/764 |
| 2020/0349695 | A1* | 11/2020 | Horita | G01N 21/892 |
| 2022/0148150 | A1* | 5/2022 | Matsumoto | G06T 11/60 |

FOREIGN PATENT DOCUMENTS

| | | | | |
|---|---|---|---|---|
| CN | 105510351 A | * | 4/2016 | ............ G01N 21/88 |
| CN | 105510351 A | | 4/2016 | |
| CN | 109115434 A | | 1/2019 | |
| CN | 109246364 A | | 1/2019 | |
| CN | 110487816 A | | 11/2019 | |
| CN | 110593957 A | | 12/2019 | |
| CN | 210720194 U | | 6/2020 | |
| EP | 3442213 B1 | * | 12/2020 | ........... G01N 21/954 |
| KR | 20120086963 A | | 8/2012 | |

OTHER PUBLICATIONS

English Translation of CN-104019742-A (Year: 2014).*
International Search Report, issued in PCT/CN2020/117088, dated Nov. 30, 2020.
Written Opinion, issued in PCT/CN2020/117088, dated Nov. 30, 2020.

* cited by examiner

TUNNEL-INSPECTION IMAGE ACQUISITION DEVICE, TUNNEL-INSPECTION SYSTEM, AND TUNNEL-INSPECTION METHOD

BACKGROUND OF THE INVENTION

Field of the Invention

The invention belongs to the technical field of tunnel defect detection, in particular, to a tunnel-inspection image acquisition device, a tunnel-inspection system, and a tunnel-inspection method.

Description of the Prior Art

With the rapid development of railways and urban rail transit in China, more and more attention has been paid to the safety of subway tunnels, and problems such as cracking, leakage, and deformation in tunnels are inevitable. These problems seriously affect the driving safety of railway and rail transit, so tunnel-inspection operation is essential.

Currently, the domestic tunnel-inspection operation mainly relies on manual operations, which leads to the overall inefficiency, low accuracy, easily-missed inspection, and long time-consuming problems for the current tunnel-inspection operation. Nowadays, automatic intelligent inspection devices are mainly used for large defect detecting vehicles with complex structures, high cost, and small detection range. In particular, the current tunnel inspection and defect detecting vehicles are inefficient. Tunnel images need to be collected at first. Tunnel image processing and disease point detection on the background platform are performed after all the tunnel images are collected. Then, the maintenance and other departments should be notified to deal with the diseases after the diseases are found. As a result, the cycle of tunnel inspection and post-processing is time-consuming.

SUMMARY OF THE INVENTION

In order to solve the above problems, the invention provides a tunnel-inspection image acquisition device, a tunnel-inspection system, and a tunnel-inspection method, which have technical features of simple structure, large detection range, high timeliness, fast detection speed, high recognition accuracy, accurate inspection positioning, and clear captured images.

The technical solution of the invention is as follows:

A tunnel-inspection image acquisition device is applied to image acquisition of a tunnel lining and includes a plurality of CCD cameras, a plurality of auxiliary light sources used for the CCD cameras to shoot and expose and a fixing bracket, the CCD cameras, and the auxiliary light sources being fixed on the fixing bracket, wherein the plurality of CCD cameras are fixed on the same ring, a center of the ring is located at a center of a circle of the tunnel in working condition to ensure that distances between the plurality of CCD cameras and a tunnel lining are the same, and overall shooting angles of the plurality of CCD cameras cover a range of the tunnel lining.

In one embodiment, the CCD camera and the auxiliary light source are fixed on the bracket at fixed intervals. In an embodiment, the shooting angles between the adjacent CCD cameras partially overlap.

In an embodiment, the fixing bracket includes a base, a fixing block, and a plurality of supporting rods; the base is fixedly connected with the fixing block, one end of the supporting rod is fixedly connected with the fixing block, and the other end of the supporting rod is fixedly connected with the CCD camera or the auxiliary light source.

In an embodiment, the auxiliary light source is an LED array light source.

The invention further provides a tunnel-inspection system including a defect detecting mobile platform traveling on rails, and further includes a computer, a monitor, a synchronous encoder, a data collector and the tunnel-inspection image acquisition device provided above, wherein the fixing bracket is built on the defect detecting mobile platform, and a center of the ring where the plurality of CCD cameras are located is located at a center of a circle of the tunnel in working condition to ensure that distances between the plurality of CCD cameras and the tunnel lining are the same; the synchronous encoder is electrically connected with the CCD cameras and the auxiliary light sources respectively for sending a synchronous pulse signal every fixed distance according to a displacement of the defect detecting mobile platform to trigger the plurality of the CCD cameras and the plurality of the auxiliary light sources to work synchronously; the data collector is electrically connected with the plurality of the CCD cameras and the synchronous encoder respectively for collecting tunnel lining images captured by the CCD cameras and numbering the tunnel lining images in combination with the synchronous encoder; the computer is electrically connected with the data collector and the monitor respectively for performing image recognition of the tunnel lining images, marking disease points, and after marking the disease points, splicing the tunnel lining images and displaying the tunnel lining images in real time.

In an embodiment, the tunnel-inspection system further includes a positioning device. The positioning device and the computer are connected by means of communication, The auxiliary light source controller and the computer are connected by communication, the positioning device being used to read and write RFID tags in the tunnel, wherein positioning information in the RFID tags are read and fed back to the computer for mileage correction of the defect detecting mobile platform; tunnel structure information in the RFID tags are read and fed back to the computer to adjust parameters of a brightness and an exposure of the auxiliary light sources for changing a depth of field of images to acquire clear images; disease point information fed back by the computer are written into the RFID tags for marking locations of the disease points.

In an embodiment, the computer, the monitor, the synchronous encoder, the data collector, the tunnel-inspection image acquisition device and the positioning device are configured on the defect detecting mobile platform detachably respectively.

The invention further provides a tunnel-inspection method, which includes steps of:

S1: after the defect detecting mobile platform enters a tunnel region, adjusting a center of the ring where the plurality of CCD cameras on the defect detecting mobile platform are located to be a center of a circle of the tunnel to ensure that distances between the plurality of CCD cameras and the tunnel lining are the same, and then initiating tunnel-inspection;

S2: sending a synchronous pulse period signal every fixed distance according to a displacement of the defect detecting mobile platform to trigger the plurality of the CCD cameras and the plurality of the auxiliary light sources used for the CCD cameras to shoot and expose to work synchronously for shooting the tunnel lining images;

S3: collecting the tunnel lining images in real time, and numbering the tunnel lining images in combination with the synchronous pulse period signal;

S4: performing image recognition, marking disease points, making online alarm for the tunnel lining images after the numbering, and after marking the disease points, splicing the tunnel lining images and displaying the tunnel lining images in real time.

In an embodiment, during the execution process of the steps S1 to S4, the method further includes steps of: reading the RFID tags in the tunnel, and adjusting parameters of a brightness and an exposure of the auxiliary light sources according to the tunnel structure information of the RFID tags for changing a depth of field of images to acquire clear images.

In an embodiment, the step S4 further includes steps of: writing the disease point information into the RFID tags in the tunnel if the image recognition detects the disease points.

In an embodiment, the step S2 specifically includes steps of:

S21: generating a pulse signal with direction and displacement according to the displacement of the defect detecting mobile platform;

S22: integrating and processing the pulse signal to obtain the synchronous pulse period signal, judging a current walking direction of the defect detecting mobile platform and the number of pulses to obtain a mileage of the defect detecting mobile platform, and then performing multi-channel output for the synchronous pulse period signal to trigger the CCD cameras and the auxiliary light sources to work synchronously, for shooting the tunnel lining images.

In an embodiment, during the execution process of the steps S1 to S4, the method further includes steps of: reading the RFID tags in the tunnel, and performing mileage correction of the defect detecting mobile platform according to the positioning information in the RFID tags.

In an embodiment, in the step S4, the image recognition specifically includes steps of:

A1: receiving and storing the tunnel lining images;

A2: recognizing and cropping overlapping regions of the tunnel lining images;

A3: performing image filtering for the cropped tunnel lining images, and smoothing impurity factors in the tunnel lining images obtained by the image filtering;

A4: performing overall suppression for a pixel gray value of the impurity factors, and recognizing preliminarily the overall-suppressed tunnel lining images to perform overall enhancement for the pixel gray value of suspected disease point;

A5: determining whether the suspected disease point is a disease point by comparing a similarity between the suspected disease point and a theoretical model, and feeding back the disease point information.

Compared with the prior art, the invention has the following advantages and positive effects:

1) in the tunnel-inspection image acquisition device of the invention, the plurality of CCD cameras are configured and the plurality of CCD cameras are fixed on the same ring, and a center of the ring is located at a center of a circle of the tunnel in working condition, so as to ensure that distances between the plurality of CCD cameras and a tunnel lining are the same, there is no need to adjust parameters such as a focal length during the shooting process, the collected images are not easily deformed and actual sizes of the images shot by each lens are the same, thereby greatly reducing the difficulty of image processing, facilitating real-time processing of images and improving the timeliness of image processing; meanwhile, since configuring at the same ring is adopted, a detection range may be greatly improved up to 360°, which is convenient to cover the range of the tunnel lining surface, and may complete the clear photography of the whole tunnel section (such as circle, rectangle, horseshoe, etc.) at different sight distances, thereby the technical effect of easy image processing and large detection range;

2) in the tunnel-inspection image acquisition device of the invention, the CCD cameras and the auxiliary light sources are sequentially disposed on the fixing bracket at intervals, and each of the auxiliary light sources may be used for the exposure of two CCD cameras, which improves the utilization of the auxiliary light sources and reduces the cost; meanwhile, under the same shooting requirements, an exposure difference between shots is reduced the CCD cameras, which further improves the consistency between images and improves the timeliness of image processing;

3) in the tunnel-inspection image acquisition device of the invention, the shooting angles between the adjacent CCD cameras partially overlap, which not only reduces the possibility of appearing missed regions, but also may reduce the difficulty in splicing images by using the overlapping parts of the images, thereby facilitating real-time processing of images and improving the timeliness of image processing;

4) in the tunnel-inspection image acquisition device of the invention, the structure of the fixing bracket is simple and lightweight, easy to transport and store, which reduces the cost, and with the LED array light source, a light band with uniform brightness may be formed on a tunnel wall and the exposure difference between shots is reduced for the CCD cameras under the same shooting requirements, thereby further improving the consistency between images and improving the timeliness of image processing;

5) the tunnel-inspection image acquisition device of the invention performs the synchronous shooting, the disease identification, the real-time splicing and display of the tunnel with the cooperation of the computer, the monitor, the synchronous encoder and the data collector by being configured on the defect detecting mobile platform, wherein based on the handleability of the images collected by the tunnel-inspection image acquisition device, the recognition speed and the splicing speed of the tunnel-inspection system are improved, so that the real-time display on site may be realized, and users may perform on-site processing of inspection through the content displayed in real time or notify relevant departments in time for processing, thereby greatly improving the timeliness of tunnel-inspection and achieving the technical features of high efficiency, short detection time, high accuracy and being not easy to miss detection;

6) in the tunnel-inspection system of the invention, the detachable modular design is adopted, which is convenient for separate storage and transportation while improving the convenience of the system;

7) in the tunnel-inspection method of the invention, a center of the ring where the plurality of CCD cameras on the defect detecting mobile platform are located is adjusted to be a center of a circle of the tunnel to ensure that distances between the plurality of CCD cameras and the tunnel lining are the same, so that there is no need to adjust parameters such as the focal length during the shooting process, the collected images are not easily deformed and actual sizes of the images shot by each lens are the same, thereby greatly reducing the difficulty of image processing, facilitating real-time processing of images and improving the recognition speed and the splicing speed of the tunnel-inspection system, as well as achieving the real-time display on site; then, the users may perform on-site processing of inspection through the content displayed in real time or notify relevant departments in time for processing, thereby greatly improving the timeliness of tunnel-inspection and achieving the technical features of high efficiency, short detection time, high accuracy and being not easy to miss detection;

8) in the tunnel-inspection method of the invention, operations of reading and writing the RFID tags may perform marking of the disease points, adjustment of the auxiliary light sources and mileage correction of the defect detecting mobile platform, so as to facilitate later re-inspection, as well as automatically changing the brightness and the exposure parameters of the light sources, thereby changing the depth of field of images to shoot clear images; meanwhile, the mileage correction also improves the accuracy of positioning the diseased points, and achieves the technical effects of traceability of the diseased points, accurate inspection and positioning as well as clear shot images;

9) in the tunnel-inspection method of the invention, by reducing recognition regions through image cropping, by reducing impurity factors that interfere with the recognition through image filtering, by suppressing impurity factors and identifying and highlighting suspected disease points through image enhancement and by confirming whether the detected region is the disease point through similarity comparison, the technical effects of fast recognition speed and high recognition accuracy are achieved.

BRIEF DESCRIPTION OF THE DRAWINGS

By reading the detailed description of the preferred embodiments below, various other advantages and benefits will become clear to those of ordinary skill in the art. The drawings are only used for the purpose of illustrating the preferred embodiments, and are not considered as a limitation to the invention.

DESCRIPTION OF REFERENCE NUMERALS

1—tunnel-inspection image acquisition device; 11—CCD camera; 12—auxiliary light source; 13—fixing bracket; 131—supporting rod; 132—fixing block; 133—base; 2—defect detecting mobile platform; 31—computer; 32—monitor; 33—synchronous encoder; 34—data collector; 35—positioning device.

DESCRIPTION OF THE PREFERRED EMBODIMENTS

In order to more clearly describe the embodiments of the invention or the technical solutions in the prior art, the specific embodiments of the invention will be described below with reference to the accompanying drawings. Obviously, the drawings below are only some examples of the invention, and those skilled in the art may obtain other drawings and other embodiments on the basis of these drawings without making creative efforts.

In order to keep the drawings concise, the drawings only schematically show the parts related to the invention, and they do not represent its actual structure as a product. In addition, in order to make the drawings concise and easy to understand, in some drawings, only one of the components having the same structure or function is schematically shown, or only one of them is marked. As used herein, "alone" not only means "only one", but also "more than one".

A tunnel-inspection image acquisition device 1 and a tunnel-inspection system provided by the invention will be further described in combination with drawings and specific embodiments.

Embodiment 1

Figure 1:
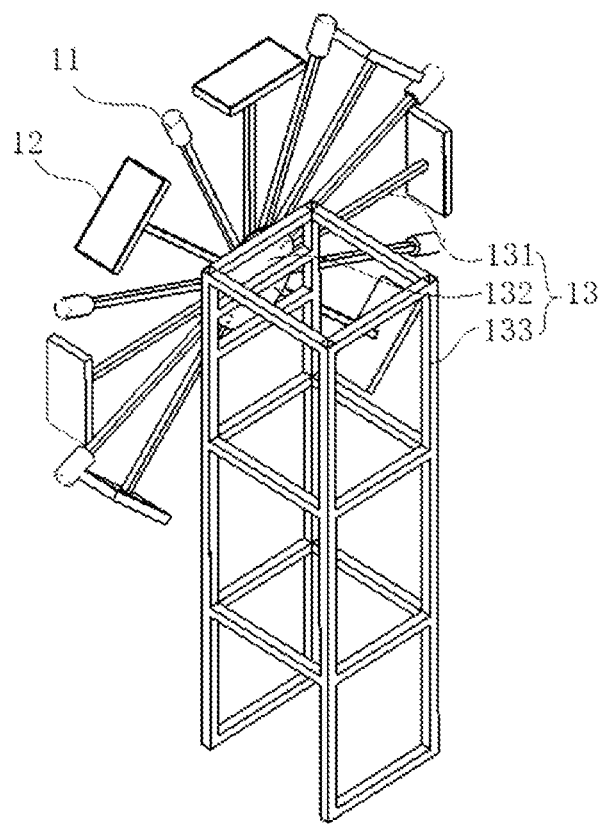
FIG. 1 is a three-dimensional structure diagram of a tunnel-inspection image acquisition device of the invention.

With reference to FIG. 1, the application provides a tunnel-inspection image acquisition device, which is applied to image acquisition of a tunnel lining and includes a plurality of CCD cameras 11, a plurality of auxiliary light sources 12 used for the CCD cameras 11 to shoot and expose and a fixing bracket 13, the CCD cameras 11 and the auxiliary light sources 12 being fixed on the fixing bracket 13, wherein the plurality of CCD cameras 11 are fixed on the same ring, a center of the ring is located at a center of a circle of the tunnel in working condition to ensure that distances between the plurality of CCD cameras 11 and a tunnel lining are the same, and overall shooting angles of the plurality of CCD cameras 11 cover a range of the tunnel lining.

The embodiment will now be described in detail:

The tunnel-inspection image acquisition device of the embodiment may be installed on any platform, and is connected and installed through the fixing bracket 13 to perform image acquisition of the tunnel-inspection.

Figure 2:
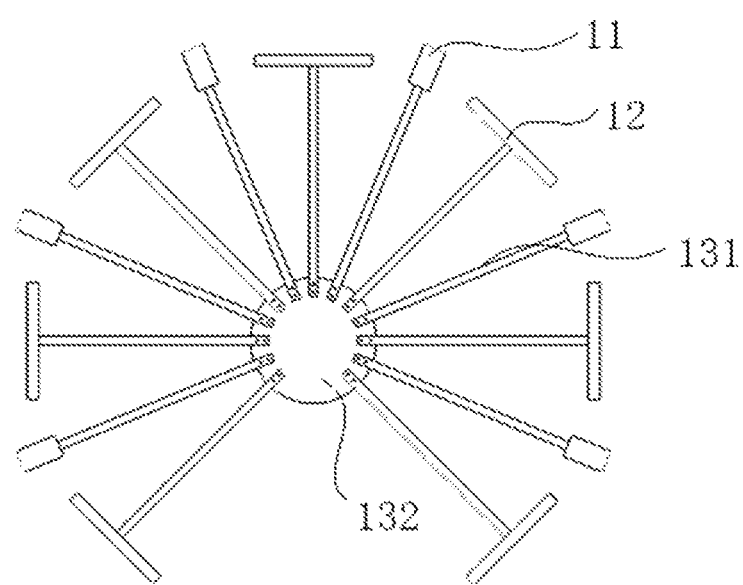
FIG. 2 is a planar structure diagram of a tunnel-inspection image acquisition device of the invention.

With reference to FIGS. 1 and 2, the embodiment uses 6 CCD cameras 11 and 7 auxiliary light sources 12; the auxiliary light sources 12 are stroboflash array light sources and distributed on the same ring through the fixing bracket 13, which has the advantages of closely arranging the auxiliary light sources 12 and the CCD cameras 11 on the same bracket and a simple overall structure. In the embodiment, each of the auxiliary light sources 12 is spaced from each of the CCD cameras 11 by 22.5°, 6 CCD cameras 11 are communicated with each other, and a circumferential shooting angle of each of the CCD cameras 11 is 48°, so as to completely cover 270° of the tunnel (with partial overlapping regions); the auxiliary light sources 12 use the LED array light source and arranged by way of spacing apart by 45°, which may form a light band with uniform lightness on the wall surface of the tunnel. The above-mentioned angle setting, quantity setting, and equipment selection are only a specific technical solution of the application. Similarly, the above design may be adjusted according to the structure of the tunnel, the circumferential shooting angle of the camera, etc., and a maximum shooting coverage of 360° may be achieved. In an embodiment, with the consideration of the existence and cost of steel rails, the overall shooting angle of 270° is the best choice for the application, so that clear photos of different sight distances of the entire tunnel section (such as circle, rectangle, horseshoe, etc.) may be completed.

In the embodiment, the plurality of CCD cameras 11 are configured and the plurality of CCD cameras 11 are fixed on the same ring, and a center of the ring is located at a center of a circle of the tunnel in working condition, so as to ensure that distances between the plurality of CCD cameras and a tunnel lining are the same, there is no need to adjust parameters such as a focal length during the shooting process, the collected images are not easily deformed and actual sizes of the images shot by each lens are the same, thereby greatly reducing the difficulty of image processing, facilitating real-time processing of images and improving the timeliness of image processing; meanwhile, since configuring at the same ring is adopted, a detection range may be greatly improved up to 360°, which is convenient to cover the range of the tunnel lining surface, and may complete the clear photography of the whole tunnel section at different sight distances, thereby the technical effect of easy image processing and large detection range.

Specifically, with reference to FIG. 1, in the embodiment, the fixing bracket 13 includes a base 133, a fixing block 132 and a plurality of supporting rods 131; the base 133 is fixedly connected with the fixing block 132, one end of the supporting rod 131 is fixedly connected with the fixing block 132, and the other end of the supporting rod 131 is fixedly connected with the CCD camera 11 or the auxiliary light source 12. Similarly, the fixing bracket 13 may also be an annular supporting plate, and the CCD cameras 11 and the auxiliary light sources 12 are mounted on the supporting plate for further aiding the bracket in overall fixed support. In the embodiment, the structure of the fixing bracket 13 is simple and lightweight, easy to transport and store, which reduces the cost, and with the LED array light source, a light band with uniform brightness may be formed on a tunnel wall and the exposure difference between shots is reduced for the CCD cameras 11 under the same shooting requirements, thereby further improving the consistency between images and improving the timeliness of image processing.

Preferably, with reference to FIG. 2, the CCD cameras 11 and the auxiliary light sources 12 are sequentially fixed on the fixing bracket 13 at intervals. In the embodiment, with such arrangement, each of the auxiliary light sources 12 may be used for the exposure of two CCD cameras 11, which improves the utilization of the auxiliary light source 12 and reduces the cost; the exposure difference between shots is reduced for the CCD cameras 11 under the same shooting requirements, thereby improving the consistency between images and improving the timeliness of image processing; meanwhile, with the LED array light source, a light band with uniform brightness may be formed on a tunnel wall, which also reduces the exposure difference between shots for the CCD cameras 11, thereby further improving the consistency between images and improving the timeliness of image processing.

Preferably, in the embodiment, the shooting angles between the adjacent CCD cameras 11 partially overlap. In the invention, the shooting angles between the adjacent CCD cameras 11 partially overlap, which not only reduces the possibility of appearing missed regions, but also may reduce the difficulty in splicing images by using the overlapping parts of the images, thereby facilitating real-time processing of images and improving the timeliness of image processing.

Embodiment 2

Figure 3:
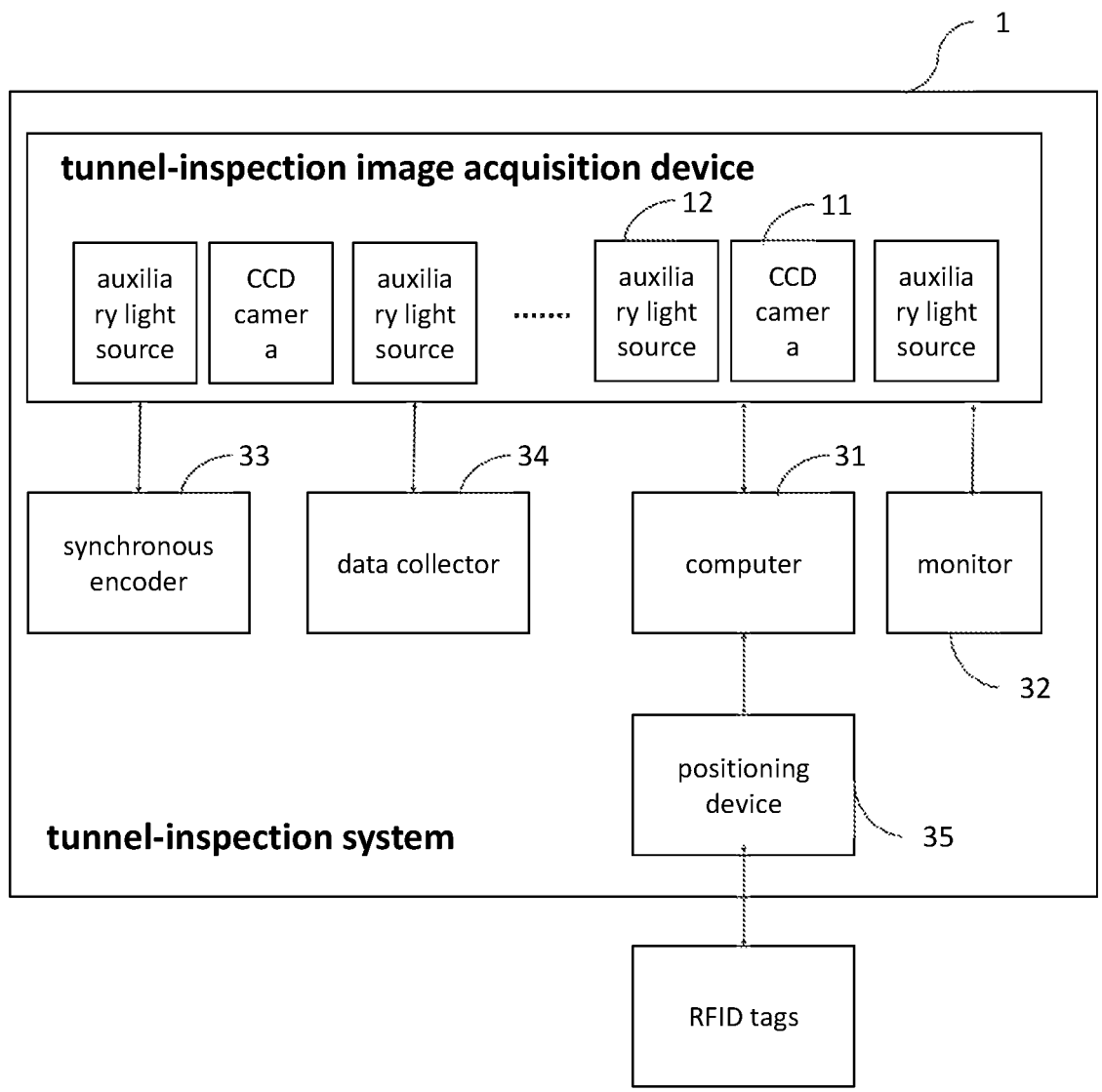
FIG. 3 is an overall structure diagram of a tunnel-inspection system of the invention.

With reference to FIG. 3, the application provides a tunnel-inspection system based on Embodiment 1, which includes a defect detecting mobile platform 2 traveling on rails, and further includes a computer 31, a monitor 32, a synchronous encoder 33, a data collector 34 and the tunnel-inspection image acquisition device 1 according to Embodiment 1 that are disposed on the defect detecting platform 2;

the fixing bracket 13 is built on the defect detecting mobile platform 2, and a center of the ring where the plurality of CCD cameras 11 are located is located at a center of a circle of the tunnel in working condition to ensure that distances between the plurality of CCD cameras 11 and the tunnel lining are the same; the synchronous encoder 33 is electrically connected with the CCD cameras 11 and the auxiliary light sources 12 respectively for sending a synchronous pulse signal every fixed distance according to a displacement of the defect detecting mobile platform 2 to trigger the plurality of the CCD cameras 11 and the plurality of the auxiliary light sources 12 to work synchronously; the data collector 34 is electrically connected with the plurality of the CCD cameras 11 and the synchronous encoder 33 respectively for collecting tunnel lining images captured by the CCD cameras 11 and numbering the tunnel lining images in combination with the synchronous encoder 33; the computer 31 is electrically connected with the data collector 34 and the monitor 32 respectively for performing image recognition of the tunnel lining images, marking disease points, and after marking the disease points, splicing the tunnel lining images and displaying the tunnel lining images in real time after marking the disease points.

Figure 4:
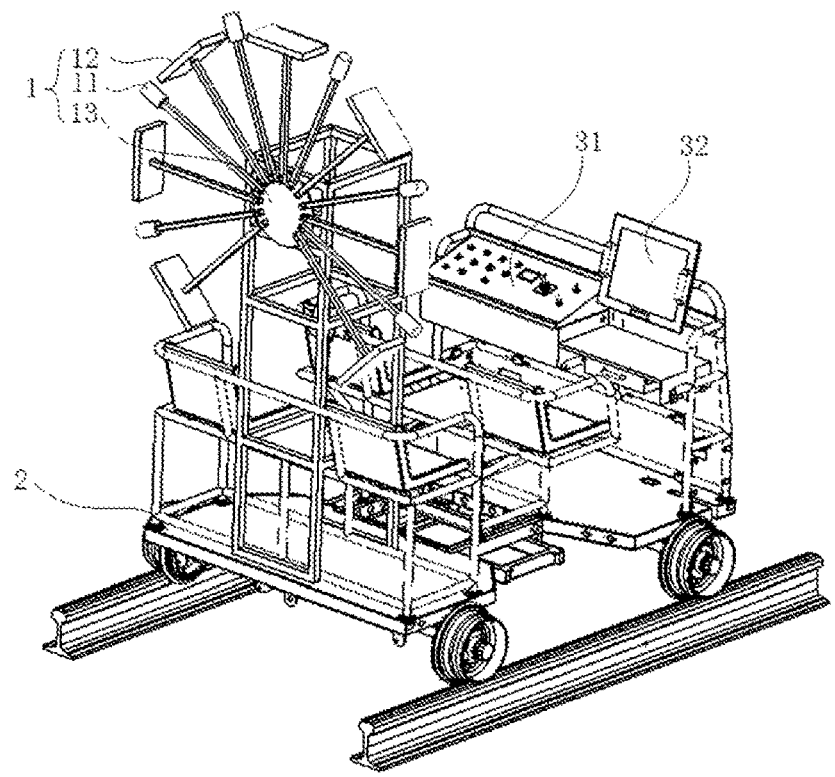
FIG. 4 is a diagram showing installation positions of a tunnel-inspection system of the invention.
Figure 5:
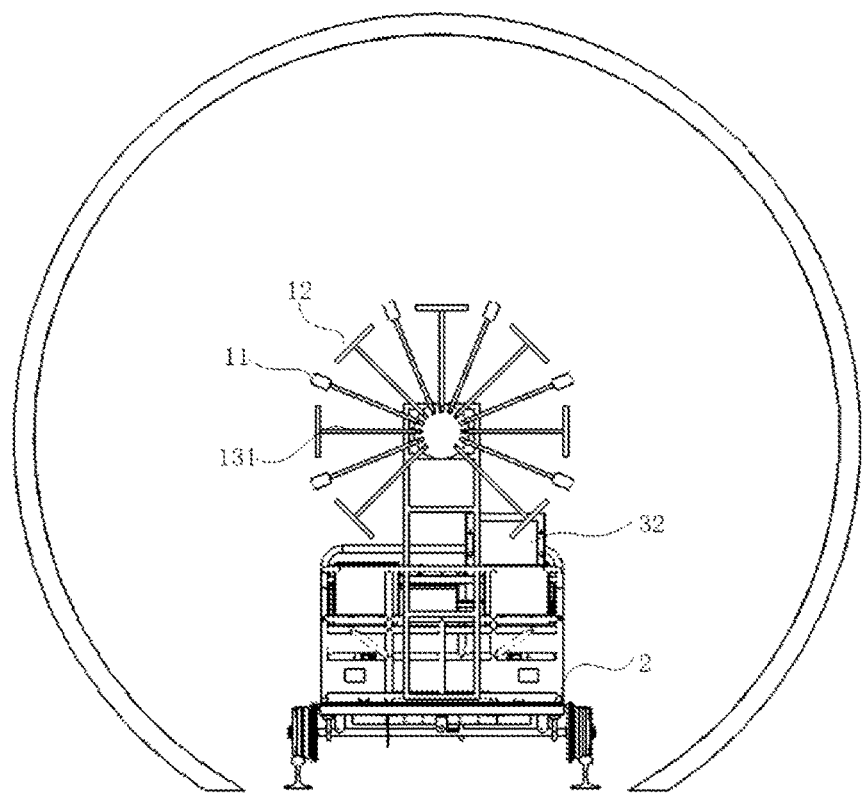
FIG. 5 is an architecture block diagram of a tunnel-inspection system of the invention.

The embodiment will now be described in detail:

With reference to FIGS. 4 and 5, the defect detecting mobile platform 2 of the embodiment is a double-rail defect defecting vehicle, which may move on the rails, wherein the tunnel-inspection image acquisition device 1 is fixedly mounted on a tail of a vehicle body and protrudes from the vehicle body, a center of a circle where the mounted tunnel-inspection image acquisition device 1 and the plurality of CCD cameras 11 are located is located at a center of a circle of the tunnel, so that distances between lenses of the CCD industrial cameras and the tunnel lining may be ensured to remain consistent. A front portion of the double-rail defecting vehicle is provided with the computer 31 and the monitor 32 to manipulate the whole double-rail defecting vehicle and the tunnel-inspection system; users may adjust the relevant parameters of the tunnel-inspection system in real time on the spot, may view the photos shot by the tunnel-inspection system in real time on the spot and may confirm whether the tunnel has any disease points, wherein if there is a disease point, the relevant departments may be notified in time for maintenance and other operations.

The synchronous encoder 33 of the embodiment may be mounted on a mobile bearing of the defect detecting mobile platform 2, and generates a pulse signal with direction and displacement according to the rotation of the bearing for synchronously triggering the CCD cameras 11 and the light sources, wherein a method of triggering a shooting synchronously after driving a fixed distance is used. Specifically, with reference to FIG. 6, an A+ signal, a B+ signal, an A− signal and a B− signal are generated according to the movement of the vehicle body and are transmitted to a signal processor; the signal processor integrates and processes the pulse signals generated by the synchronous encoder 33 to determine a running direction and the number of pulses of the double-rail defect detecting vehicle currently equipped with an intelligent tunnel-inspection system, determine a corresponding encoded value and upload it to the computer 31 for image storage and trigger the CCD array cameras and a light source controller to work synchronously through appropriate multi-frequency transmission; the CCD array cameras and the light source controller receive the corresponding pulse signal to trigger the CCD array cameras to operate to collect image data of the tunnel lining, and the light source controller receives the pulse signals to control a switching frequency of the light source to synchronize a shooting frequency of the CCD array cameras, so as to ensure that an inside of the tunnel is bright enough when the CCD array cameras shoot.

The data collector 34 of the embodiment may be a switch, wherein the switch may be a switch operating from multiple channels to one channel, which may realize data aggregation and simplify a communication connection line between the cameras and the computer 31. After the computer 31 receives the tunnel lining image transmitted by the data collector 34, the computer 31 performs image recognition of the diseased points, wherein by collecting a large number of on-site images of the inside of the tunnel in the early stage, a large number of analysis and statistics of regional grayscale differences are performed between normal images such as pedestrian platforms, electrical cable pipes, tunnel segment joints, fire exit lights, electrical boxes, fire emergency telephones, train platforms, fire pipes and stairs and content of the problem images for providing basic technical preparations for various types of intelligent recognition of the tunnel-inspection.

Figure 7:
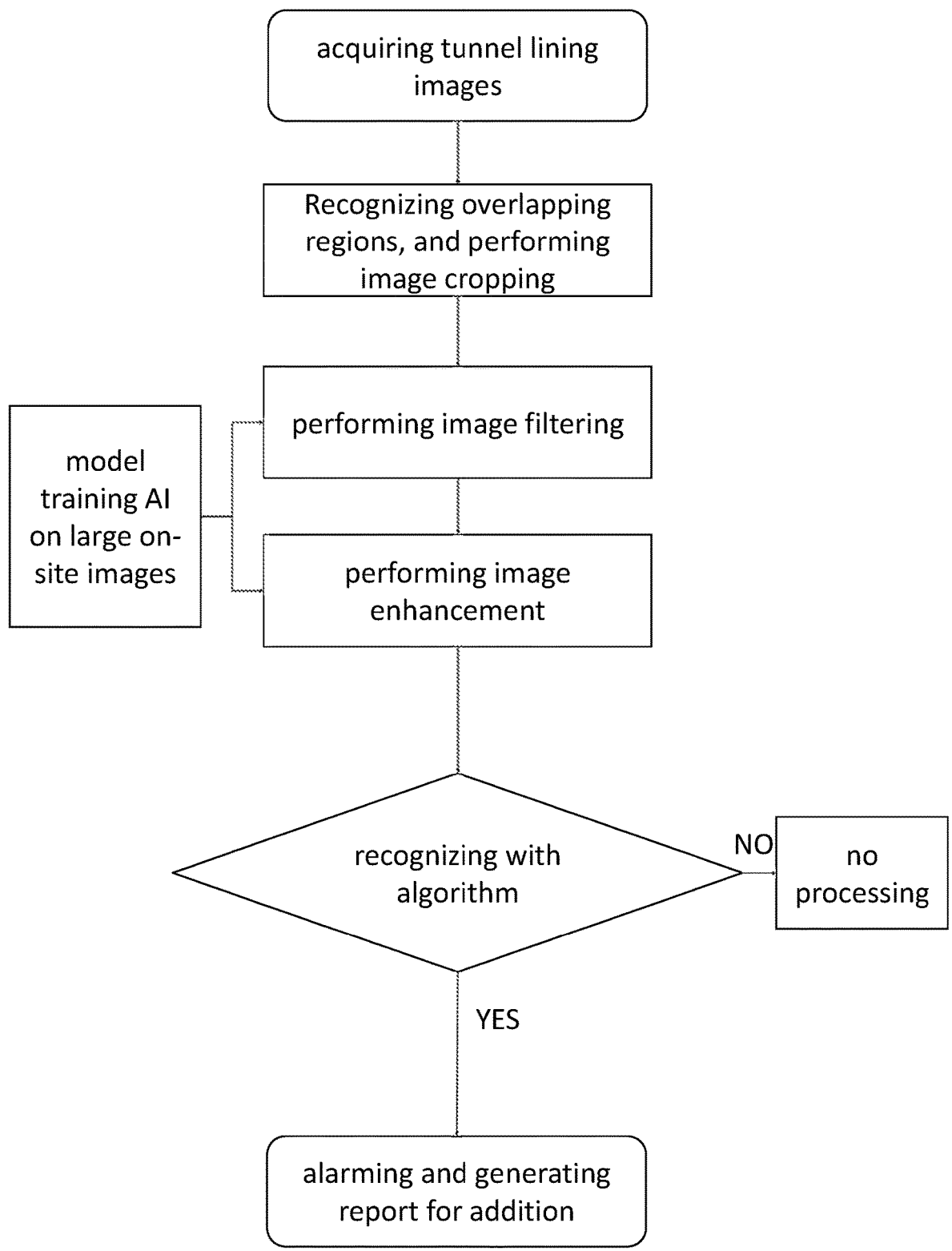
FIG. 7 is a flow chart of disease recognition of a tunnel-inspection system of the invention.

With reference to FIG. 7, the image recognition of disease point images specifically has the following process: first step: through the cooperation of the stroboscopic array LED light sources and the array CCD industrial cameras, the system continuously collects 270° tunnel lining images of the entire tunnel and saves them, and performs image cropping for image overlapping regions; second step: some randomly distributed impurities such as tunnel segments and platforms are filtered through the image filtering so that surfaces of the tunnel segments and platforms are smoother, which helps to improve the efficiency of the tunnel intelligent algorithm; third step: the image enhancement is to suppress the gray value of the image pixels of the surfaces such as ordinary tunnel segments, platforms as a whole, and to strengthen the special points such as cracks and water leakage as a whole, which facilitates the tunnel disease recognition algorithm to quickly screen out suspected disease points; fourth step: by comparing a similarity between the suspected damage points and a theoretical model, an abnormal alarm will be issued if the similarity conforms to the theoretical model and a problem point report will be generated.

With reference to FIG. 3, preferably, the tunnel-inspection system further includes a positioning device 35. The positioning device 35 and the computer 31 are connected by means of communication, The auxiliary light source 12 controller and the computer 31 are connected by communication, the positioning device 35 being used to read and write RFID tags in the tunnel, wherein positioning information in the RFID tags are read and fed back to the computer 31 for mileage correction of the defect detecting mobile platform 2; tunnel structure information in the RFID tags are read and fed back to the computer 31 to adjust parameters of a brightness and an exposure of the auxiliary light sources 12 for changing a depth of field of images to acquire clear images; disease point information fed back by the computer 31 are written into the RFID tags for marking locations of the disease points.

Specifically, the positioning device 35 is provided with a car reader, which reads tag information in time through a positioning system for transferring the tag information to the computer 31 and generate a ledger in the background by using Ethernet, Bluetooth, Zigbee, WLAN or RS232, RS485 and other communication methods; preferably, if the tag is an integral kilometer mileage tag, the system will automatically trigger the mileage correction to reduce a frequency of the mileage correction, and if the tag is intelligently recognized as having the disease, the computer 31 will automatically perform marking, i.e., controlling the car reader to write the disease information in the RFID tags, so as to facilitate later review. If the inspection system travels through areas where the dimensions of the tunnel structure vary, the inspection system may be notified in advance through the tags, and the inspection system will automatically change the brightness and exposure parameters of the light sources when arriving at the position, thereby changing the depth of field effect of the images and shooting clear images. Preferably, the car reader is based on RFID technology. The tunnel-inspection system of the embodiment, by reading and writing the RFID tags with the positioning device 35, may perform marking of the disease points and mileage correction of the defect detecting mobile platform 2, so as to facilitate later re-inspection; meanwhile, the mileage correction also improves the accuracy of positioning the diseased points, and achieves the technical effects of traceability of the diseased points.

Preferably, the computer 31, the monitor 32, the synchronous encoder 33, the data collector 34, the tunnel-inspection image acquisition device 1 and the positioning device 35 are configured on the defect detecting mobile platform 2 detachably respectively. The tunnel-inspection system of the invention adopts the detachable modular design, which is convenient for separate storage and transportation while improving the convenience of the system.

The operation process of the embodiment will be described now as below:

The entire operation process of the tunnel-inspection system is as follows:

S1: a vehicle travels into a tunnel region for inspection;

S2: the synchronous encoder 33 self-triggers the synchronous pulse period signals with the advance of the double-rail defect detecting vehicle, and simultaneously sends the signals to the CCD industrial cameras and the light source controller to make them operation synchronously, as well as completing an image acquisition after driving the fixed distance;

S3: during the traveling process of the double-rail defect detecting vehicle, the integral kilometer is marked by the RFID positioning system, the computer 31 is notified in advance through the RFID tags where the dimensions of the tunnel change, and the inspection system will automatically change the brightness and exposure parameters of the light sources when arriving at the position, thereby changing the depth of field effect of the images and shooting clear images;

S4: the data collector 34 collects the images in real time, numbers the corresponding images in combination of the synchronous encoder 33, and then upload the images to the computer 31 through various communication methods of Ethernet, Bluetooth, Zigbee, WLAN or RS232, RS485 and other communication methods;

S5: the intelligent recognition system in the computer 31 realizes the recognition of water leakage through grayscale difference features of local images, and realizes automatic recognition functions such as recognizing falling off of pipelines through linear grayscale difference features; for the recognized disease points, the corresponding information are written in the RFID tags through the RFID positioning device 35, which is convenient for later review;

S6: the computer 31 calls the tunnel image that has been recognized and marked for the diseased points, and splices the images acquired by 6 CCD cameras 11 at the same time through an algorithm to more intuitively display the complete tunnel lining images.

The tunnel-inspection image acquisition device 1 of the invention performs the synchronous shooting, the disease identification, the real-time splicing and display of the tunnel with the cooperation of the computer 31, the monitor 32, the synchronous encoder 33 and the data collector 34 by being configured on the defect detecting mobile platform 2, wherein based on the handleability of the images collected by the tunnel-inspection image acquisition device 1 according to Embodiment 1, the recognition speed and the splicing speed of the tunnel-inspection system are improved, so that the real-time display on site may be realized, and users may perform on-site processing of inspection through the content displayed in real time or notify relevant departments in time for processing, thereby greatly improving the timeliness of tunnel-inspection and achieving the technical features of high efficiency, short detection time, high accuracy and being not easy to miss detection.

Embodiment 3

Figure 8:
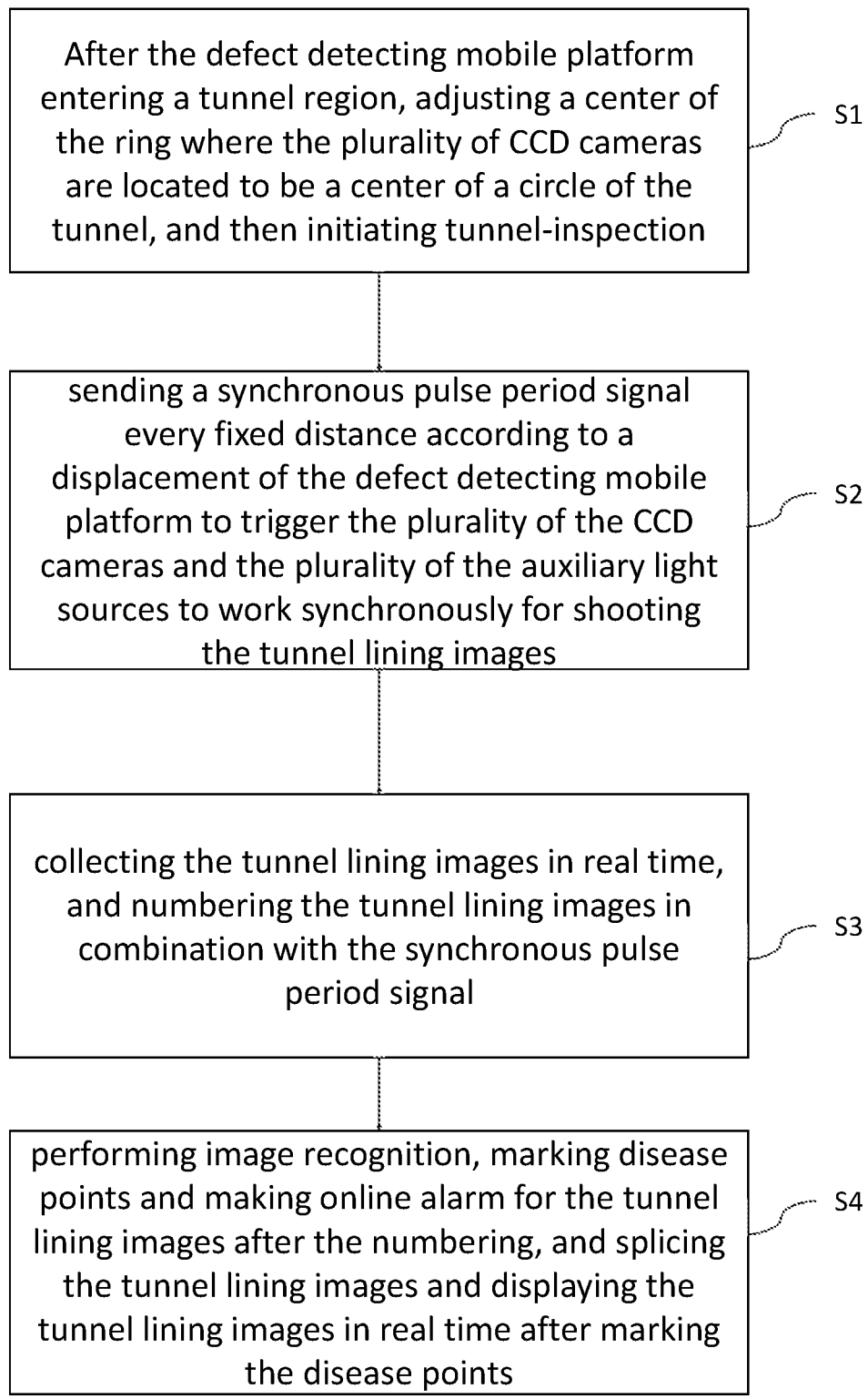
FIG. 8 is an overall flow chart of a tunnel detection method of the invention.

With reference to FIG. 8, the application provides a tunnel-inspection method, which includes the following steps:

S1: after the defect detecting mobile platform enters a tunnel region, a center of the ring where the plurality of CCD cameras on the defect detecting mobile platform are located is adjusted to be a center of a circle of the tunnel to ensure that distances between the plurality of CCD cameras and the tunnel lining are the same, and then tunnel-inspection is initiated;

S2: a synchronous pulse period signal is sent every fixed distance according to a displacement of the defect detecting mobile platform to trigger the plurality of the CCD cameras and the plurality of the auxiliary light sources used for the CCD cameras to shoot and expose to work synchronously for shooting the tunnel lining images;

S3: the tunnel lining images are collected in real time, and the tunnel lining images are numbered in combination with the synchronous pulse period signal;

S4: performing image recognition, marking disease points, making online alarm are performed for the tunnel lining images after the numbering, and after marking the disease points, the tunnel lining images are spliced and the tunnel lining images are displayed in real time.

The embodiment will now be described in detail:

With reference to FIGS. 1, 3 and 4, the defect detecting mobile platform 2 of the embodiment may be a double-rail defect defecting vehicle, which may move on the rails, and the double-rail defect defecting vehicle is mounted with the tunnel-inspection system for executing the tunnel-inspection method of the embodiment, wherein the tunnel-inspection system includes the computer 31, the monitor 32, the synchronous encoder 33, the data collector 34, the positioning device 35 and the tunnel-inspection image acquisition device 1, and the tunnel-inspection image acquisition device 1 includes the CCD camera 11, the auxiliary light source 12 and the fixing bracket 13, the fixing bracket further including the supporting rod 131, the fixing block 132 and the base 133. The executable body of the tunnel-inspection method in the embodiment includes, but is not limited to, the above-mentioned double-rail defect detecting vehicle.

With reference to FIG. 5, the step S1 of the embodiment is as follows: after the defect detecting mobile platform enters a tunnel region, a center of the ring where the plurality of CCD cameras on the defect detecting mobile platform are located is adjusted to be a center of a circle of the tunnel to ensure that distances between the plurality of CCD cameras and the tunnel lining are the same, and then tunnel-inspection is initiated.

In the embodiment, a center of the ring where the plurality of CCD cameras on the defect detecting mobile platform are located is adjusted to be a center of a circle of the tunnel to ensure that distances between the plurality of CCD cameras and the tunnel lining are the same, so that there is no need to adjust parameters such as the focal length during the shooting process, the collected images are not easily deformed and actual sizes of the images shot by each lens are the same, thereby greatly reducing the difficulty of image processing, facilitating real-time processing of images and improving the recognition speed and the splicing speed of the tunnel-inspection system, as well as achieving the real-time display on site; then, the users may perform on-site processing of inspection through the content displayed in real time or notify relevant departments in time for processing, thereby greatly improving the timeliness of tunnel-inspection and achieving the technical features of high efficiency, short detection time, high accuracy and being not easy to miss detection.

Figure 6:
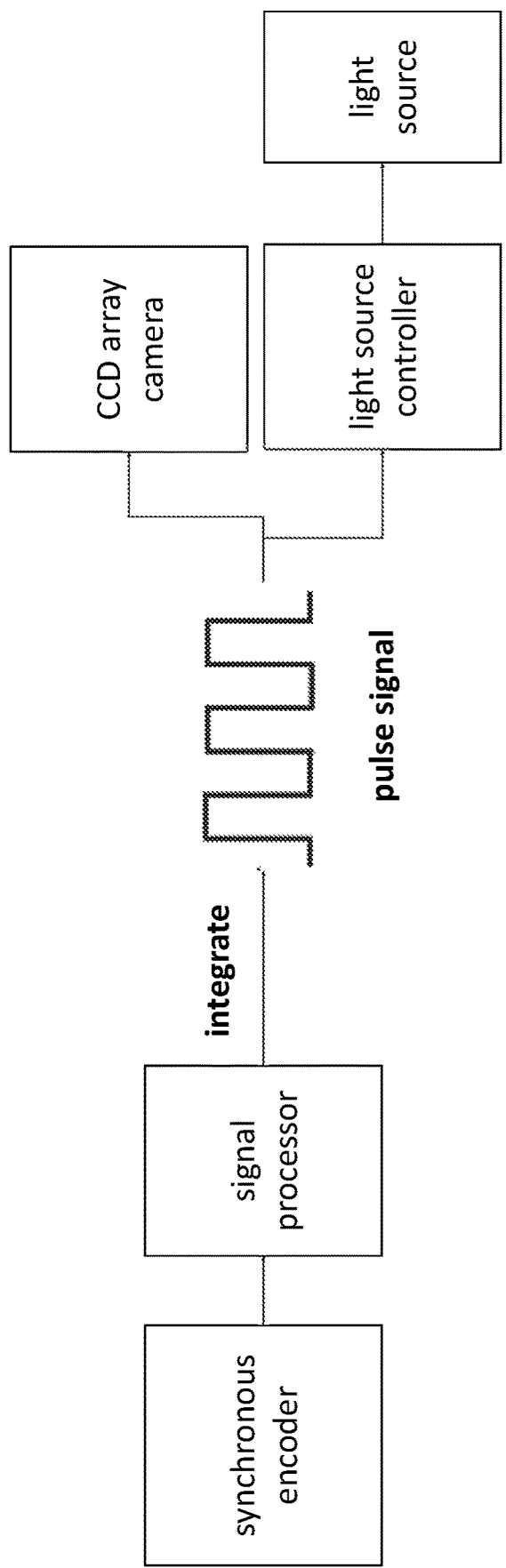
FIG. 6 is a flow chart of synchronous triggering of a tunnel-inspection system of the invention.

With reference to FIG. 6, the step S2 of the embodiment is as follows: the synchronous encoder self-triggers the synchronous pulse period signals with the advance of the double-rail defect detecting vehicle, and simultaneously sends the signals to the CCD cameras and the auxiliary light sources to make them operation synchronously, as well as completing an image acquisition every fixed driving distance;

The step S2 specifically includes the following steps: S21: when the double-rail defect defecting vehicle moves, the encoder generates an A+ signal, a B+ signal, an A− signal and a B− signal with direction and placement according to the placement of the vehicle body and the generated signals to a signal processor; S22: the signal processor integrates and processes the pulse signals generated by the synchronous encoder to determine a running direction and the number of pulses of the double-rail defect detecting vehicle currently equipped with the tunnel-inspection system, determine a corresponding encoded value and upload it to the computer and trigger the CCD array cameras and a light source controller to work through appropriate multi-frequency transmission; S23: the CCD cameras and the light source controller receive the corresponding pulse signal to trigger the CCD array cameras to operate for collecting image data of the tunnel lining, and the light source controller receives the pulse signals to control a switching frequency of the light source to synchronize a shooting frequency of the CCD array cameras, so as to ensure that an inside of the tunnel is bright enough when the CCD array cameras shoot.

The step S3 of the embodiment is as follows: the data collector collects the images in real time, numbers the corresponding images in combination of the synchronous encoder, and then upload the images to the computer through various communication methods of Ethernet, Bluetooth, Zigbee, WLAN or RS232, RS485 and other communication methods.

The step S4 of the embodiment is as follows: the computer performs image recognition, marks disease points, marks online alarm for the tunnel lining images after the numbering, and after marking the disease points, splices the tunnel lining images and display the tunnel lining images in real time. Specifically, the computer realizes the recognition of water leakage through grayscale difference features of local images, realizes automatic recognition functions such as recognizing falling off of pipelines through linear grayscale difference features, and marks the disease points according to the recognized results and makes the online alarm, wherein the online alarm may be performed through the monitor or through indicators and/or sounds for alarming. The computer calls the tunnel lining images that have been recognized and marked for the diseased points, and splices the images acquired by the CCD cameras at the same time through an algorithm to more intuitively display the complete tunnel lining images.

By collecting a large number of on-site images of the inside of the tunnel in the early stage, a large number of analysis and statistics of regional grayscale differences are performed between normal images such as pedestrian platforms, electrical cable pipes, tunnel segment joints, fire exit lights, electrical boxes, fire emergency telephones, train platforms, fire pipes and stairs and content of the problem images for providing basic technical preparations for the image recognition of the tunnel-inspection. Specifically, with reference to FIG. 7, the image recognition specifically includes the following steps: A1: through the cooperation of the auxiliary light sources of the stroboscopic array LED light sources and the CCD array cameras, the tunnel lining images of the entire tunnel are continuously collected and saved; A2: the overlapping regions of the tunnel lining images are recognized and subjected to the image cropping; A3: some randomly distributed impurities such as tunnel segments and platforms are filtered through the image filtering so that surfaces of the tunnel segments and platforms are smoother, which helps to improve the efficiency of the tunnel intelligent algorithm; A4: image enhancement: the gray value of the image pixels of the surfaces such as ordinary tunnel segments and platforms as a whole are suppressed, and the special points such as cracks and water leakage are enhanced as a whole, which facilitates the tunnel disease recognition algorithm to quickly screen out suspected disease points; A5: by comparing a similarity between the suspected disease points and a theoretical model, the disease point is determined as the suspected disease point and the disease point information are fed back if the similarity conforms to the theoretical model.

In the embodiment, by reducing recognition regions through image cropping, by reducing impurity factors that interfere with the recognition through image filtering, by suppressing impurity factors and identifying and highlighting suspected disease points through image enhancement and by confirming whether the detected region is the disease point through similarity comparison, the technical effects of fast recognition speed and high recognition accuracy are achieved Preferably, the step S4 further includes the following steps: for the recognized disease points, the corresponding information are written in the RFID tags through the positioning device, which is convenient for later review, wherein the positioning device is based on RFID technology.

Preferably, during the executing process from the step S1 to S4, i.e., during the traveling process of the double-rail defect detecting vehicle, the integral kilometer is marked by the positioning device, the tunnel-inspection system is notified in advance through the RFID tags where the dimensions of the tunnel change, and the inspection system will automatically change the brightness and exposure parameters of the light sources when arriving at the position, thereby changing the depth of field effect of the images and shooting clear images. Specifically, the positioning device reads tag information through the car reader for transferring the tag information to the computer and generate a ledger in the background by using Ethernet, Bluetooth, Zigbee, WLAN or RS232, RS485 and other communication methods, wherein if the tag is an integral kilometer mileage tag, the system will automatically trigger the mileage correction, and if the tag is intelligently recognized as having the disease, the inspection system will automatically perform marking. If the inspection system travels through areas where the dimensions of the tunnel structure vary, the inspection system may be notified in advance through the RFID tags, and the inspection system will automatically change the brightness and exposure parameters of the light sources when arriving at the position, thereby changing the depth of field effect of the images and shooting clear images.

In the embodiment, operations of reading and writing the RFID tags may perform marking of the disease points, adjustment of the auxiliary light sources and mileage correction of the defect detecting mobile platform, so as to facilitate later re-inspection, as well as automatically changing the brightness and the exposure parameters of the light sources, thereby changing the depth of field of images to shoot clear images; meanwhile, the mileage correction also improves the accuracy of positioning the diseased points, and achieves the technical effects of traceability of the diseased points, accurate inspection and positioning as well as clear images.

The implementations of the invention are described in detail above with reference to the accompanying drawings, but the invention is not limited to the above implementations. Even if various changes are made to the invention, if these changes fall within the scope of the claims of the invention and the technical equivalents thereof, they still fall within the protection scope of the invention.

What is claimed is:

1. A tunnel-inspection system, comprising a defect detecting mobile platform traveling on rails, a computer, a monitor, a synchronous encoder, a data collector, and a tunnel-inspection image acquisition device, wherein the tunnel-inspection image acquisition device, applied to image acquisition of a tunnel lining, comprises a plurality of CCD cameras, a plurality of auxiliary light sources used for the CCD cameras to shoot and expose, and a fixing bracket, wherein the CCD cameras and the auxiliary light sources are fixed on the fixing bracket, wherein the plurality of CCD cameras are fixed on a same ring, wherein a center of the ring is located at a center of a circle of the tunnel in working condition to ensure that distances between the plurality of CCD cameras and the tunnel lining are the same, and overall shooting angles of the CCD cameras cover a range of the tunnel lining, wherein the shooting angles between the adjacent CCD cameras partially overlap, wherein the auxiliary light source is an LED array light source, and wherein the fixing bracket is built on the defect detecting mobile platform, and a center of the ring where the plurality of CCD cameras are located is located at the center of the circle of the tunnel in working condition to ensure that distances between the plurality of CCD cameras and the tunnel lining are the same;

wherein the synchronous encoder is electrically connected with the CCD cameras and the auxiliary light sources respectively for sending a synchronous pulse signal every fixed distance according to a displacement of the defect detecting mobile platform to trigger the plurality of the CCD cameras and the plurality of the auxiliary light sources to work synchronously;

wherein the data collector is electrically connected with the plurality of the CCD cameras, and the synchronous encoder respectively for collecting tunnel lining images captured by the CCD cameras and numbering the tunnel lining images in combination with the synchronous encoder;

wherein the computer is electrically connected with the data collector and the monitor respectively for performing image recognition of the tunnel lining images, marking disease points, and after marking the disease points, splicing the tunnel lining images and displaying the tunnel lining images in real time;

wherein the tunnel-inspection system further comprising:
a positioning device communicatively coupled with the computer, wherein the computer is electrically connected with the auxiliary light sources, and wherein the positioning device is used to read and write RFID tags in the tunnel, and wherein positioning information in the RFID tags are read and fed back to the computer for mileage correction of the defect detecting mobile platform; wherein tunnel structure information in the RFID tags are read and fed back to the computer to adjust parameters of a brightness and an exposure of the auxiliary light sources for changing a depth of field of images to acquire clear images; and wherein disease point information fed back by the computer are written into the RFID tags for marking locations of the disease points.

2. The tunnel-inspection system according to claim 1, wherein the computer, the monitor, the synchronous encoder, the data collector, the tunnel-inspection image acquisition device, and the positioning device are configured on the defect detecting mobile platform detachably respectively.

3. A tunnel-inspection method, comprising steps of:
after the defect detecting mobile platform enters a tunnel region, adjusting a center of the ring where a plurality of CCD cameras on the defect detecting mobile platform are located to be a center of a circle of the tunnel to ensure that distances between the plurality of CCD cameras and the tunnel lining are the same, and then initiating tunnel-inspection;

sending a synchronous pulse period signal every fixed distance according to a displacement of the defect detecting mobile platform to trigger the CCD cameras and a plurality of auxiliary light sources, wherein the auxiliary light sources are used for the CCD cameras to shoot and expose to work synchronously for shooting tunnel lining images;

collecting the tunnel lining images in real time, and numbering the tunnel lining images in combination with a synchronous pulse period signal;

performing image recognition, marking disease points, making online alarm for the tunnel lining images after the numbering, and after marking the disease points, splicing the tunnel lining images and displaying the tunnel lining images in real time; and reading RFID tags in the tunnel, and adjusting parameters of a brightness and an exposure of the auxiliary light sources according to the tunnel structure information of the RFID tags for changing a depth of field of images to acquire clear images.

4. The tunnel-inspection method according to claim 3, wherein the step S2 specifically comprises steps of:
S21: generating a pulse signal with direction and displacement according to a displacement of the defect detecting mobile platform;
S22: integrating and processing the pulse signal to obtain the synchronous pulse period signal, judging a current walking direction of the defect detecting mobile platform and the number of pulses to obtain a mileage of the defect detecting mobile platform, and then performing multi-channel output for the synchronous pulse period signal to trigger the CCD cameras and the auxiliary light sources to work synchronously, for shooting the tunnel lining images.

5. A tunnel-inspection method, comprising steps of:
S1: after the defect detecting mobile platform enters a tunnel region, adjusting a center of the ring where a plurality of CCD cameras on the defect detecting mobile platform are located to be a center of a circle of the tunnel to ensure that distances between the plurality of CCD cameras and the tunnel lining are the same, and then initiating tunnel-inspection;
S2: sending a synchronous pulse period signal every fixed distance according to a displacement of the defect detecting mobile platform to trigger the CCD cameras and a plurality of auxiliary light sources, wherein the auxiliary light sources are used for the CCD cameras to shoot and expose to work synchronously for shooting tunnel lining images;
S3: collecting the tunnel lining images in real time, and numbering the tunnel lining images in combination with a synchronous pulse period signal;
S4: performing image recognition, marking disease points, making online alarm for the tunnel lining images after the numbering, and after marking the disease points, splicing the tunnel lining images and displaying the tunnel lining images in real time; and
wherein the step S4 further comprises steps of: writing disease point information into RFID tags in the tunnel if the image recognition detects the disease points.

6. The tunnel-inspection method according to claim 5, wherein the step S2 specifically comprises steps of:

S21: generating a pulse signal with direction and displacement according to a displacement of the defect detecting mobile platform;

S22: integrating and processing the pulse signal to obtain the synchronous pulse period signal, judging a current walking direction of the defect detecting mobile platform and the number of pulses to obtain a mileage of the defect detecting mobile platform, and then performing multi-channel output for the synchronous pulse period signal to trigger the CCD cameras and the auxiliary light sources to work synchronously, for shooting the tunnel lining images.

7. The tunnel-inspection method according to claim 6, during the execution process of the steps S1 to S4, further comprising steps of: reading the RFID tags in the tunnel, and performing mileage correction of the defect detecting mobile platform according to the positioning information in the RFID tags.

8. The tunnel-inspection method according to claim 5, wherein in the step S4, the image recognition specifically comprises steps of:
- A1: receiving and storing the tunnel lining images;
- A2: recognizing and cropping overlapping regions of the tunnel lining images;
- A3: performing image filtering for the cropped tunnel lining images, and smoothing impurity factors in the tunnel lining images obtained by the image filtering;
- A4: performing overall suppression for a pixel gray value of the impurity factors, and recognizing preliminarily the overall-suppressed tunnel lining images to perform overall enhancement for the pixel gray value of suspected disease point;
- A5: determining whether the suspected disease point is a disease point by comparing a similarity between the suspected disease point and a theoretical model, and feeding back disease point information.

* * * * *